2,904,557
N-PHTHALIDYL CARBAMIC ACID ESTERS

Donald D. Wheeler and David C. Young, Midland, Mich., assignors to The Dow Chemical Company, Midland, Mich., a corporation of Delaware No Drawing. Application August 6, 1958
Serial No. 753,415

6 Claims. (Cl. 260—343.3)

This invention is concerned with N-phthalidyl carbamic acid esters having the formula

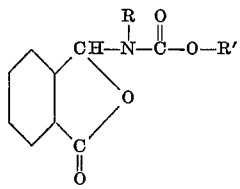

In this and succeeding formulae, R represents hydrogen and lower-alkyl radical containing from 1 to 2 carbon atoms, inclusive, and R' represents a member of the group consisting of lower-alkenyl containing from 3 to 4 carbon atoms, lower-alkyl containing from 1 to 5 carbon atoms, inclusive, lower-alkoxy-lower-alkyl, chloro-lower-alkyl, carb-lower-alkoxy-lower-alkyl, carbamoyloxy-lower-alkoxy-lower-alkyl, lower-alkoxy-lower - alkoxy-lower-alkyl, phenyl-lower-alkyl, phenyl, lower-alkylphenyl, lower-alkoxyphenyl, and chloro-phenyl. The expressions "lower-alkoxy" and "lower-alkyl" where employed without reference to carbon content refer to alkoxy and alkyl radicals containing from 1 to 4 carbon atoms, inclusive.

The new compounds are light-colored liquids or crystalline solids somewhat soluble in many organic solvents such as acetone, ethanol and benzene and substantially insoluble in water. These compounds are useful as parasiticides adapted to be employed in the control of fungi, bacteria and nematodes. These compounds are also useful as herbicides.

The above compounds may be prepared by intimately mixing phthalaldehydic acid with a carbamic acid ester having the formula

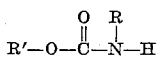

to produce the desired N-phthalidyl carbamic acid ester product and water of reaction.

The terms "phthalaldehydic acid" and "3-hydroxyphthalide" refer to a compound having the structure

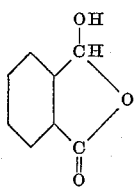

Phthalaldehydic acid is often represented in the literature as having the structure

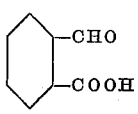

However, the acid employed in this invention and prepared as hereinafter described exists almost entirely in the closed ring 3-hydroxyphthalide structure as observed from a study of its infrared absorption spectrum. Infrared data also indicate the products of the invention to have a closed ring structure. The expression "phthalidyl" as herein employed refers to the radical

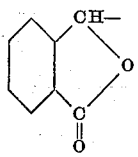

resulting from the removal of the hydroxyl group from the structure of phthalaldehydic acid.

Carbamic acid ester reactants suitable for use in the preparation of the compounds of the invention include urethane, methyl carbamate, 2-chlorethyl carbamate, butyl carbamate, isoamyl carbamate, isopropyl carbamate, allyl carbamate, 2-methylallyl carbamate, crotyl carbamate, benzyl carbamate, phenyl carbamate, 2-phenylethyl carbamate, o-tolyl carbamate, o-methoxyphenyl N-ethylcarbamate, methyl N-ethyl-carbamate, 3-chloropropyl carbamate, 2-chloroethyl N-ethylcarbamate, 2,3-dichlorophenyl N-ethylcarbamate, 3-butoxypropyl carbamate, 4-ethoxybutyl carbamate, 2-methoxyethyl N-methylcarbamate, 2-carbethoxyethyl carbamate, 2-carbisopropoxyethyl N-methylcarbamate, 2-carbethoxymethyl carbamate, 2-(2-methoxyethoxy)ethyl carbamate, 2-(2-carbamoyloxyethoxy)ethyl carbamate, 2-(2-ethoxyethoxy)-ethyl N-methylcarbamate, 2-(2-isopropoxyethoxy) ethyl carbamate, 3-phenylpropyl carbamate, 4-tertiary-butylphenyl carbamate, 4-isopropylphenyl N-methylcarbamate, 4-isopropoxyphenyl carbamate, 2-carbisopropoxyethyl carbamate and o-chlorophenyl N-ethylcarbamate.

In the synthesis, good results are obtained when substantially equimolar proportions of the reactants are employed. The reaction takes place smoothly in the temperature range of from 20° to 150° C. The preferred range is from 50° to 100° C. The reaction may be carried out in the presence of a solvent as reaction medium. Suitable solvents include water, benzene and 2-butanone. Generally, the product precipitates in the reaction mixture and may be recovered by filtration. Where the phthalide product is soluble in the reaction medium the solvent may be removed by vaporization and the product recovered as a residue.

In one method of carrying out the reaction, phthalaldehydic acid and the carbamic acid ester are mixed with a solvent and heated under reflux for from 1 to 5 hours to produce the desired product. The reaction mixture is then heated to distill off the solvent and recover an oily residue. The latter is poured into water to precipitate the desired ester product. The product, if a solid, is isoltaed by filtration, washed and dried by conventional methods. The product, if a liquid, is extracted with benzene. The benzene extract is heated to distill the solvent and to obtain a purified product as residue.

In an alternative method for carrying out the reaction, the reactants are mixed with a solvent and heated in the temperature range of from 80° to 90° C. for from several minutes to five hours to produce the desired product. Usually the product precipitates during the heating period. The mixture is then cooled to precipitate further product and the latter recovered by filtration. The product may be purified, if desired, by washing or recrystallization.

The following examples illustrate the invention but are not to be construed as limiting.

Example 1.—o-Chlorophenyl N-phthalidylcarbamate

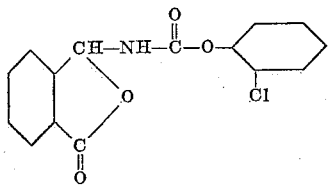

14.0 grams (0.088 mole) of o-chlorophenyl carbamate, 13.2 grams (0.088 mole) of phthalaldehydic acid and 100 milliliters of acetone were mixed and the solution heated for a total time of 5 hours. Most of the acetone was allowed to evaporate from the mixture during the first hour of heating. The mixture was then heated in the temperature range of 95° to 100° C. for 4 hours. The resulting warm mixture, which contained some solid, was slurried with hot acetone and then cooled to further precipitate an o-chlorophenyl N-phthalidylcarbamate product. The latter was isolated by filtration and after washing with acetone and drying at 60° C. melted at 270°–271° C. with decomposition.

The above product is useful for the treatment of soil for controlling the growth of seeds and emerging seedlings of many undesirable plant species. In a representative operation, aqueous compositions containing o-chlorophenyl N-phthalidylcarbamate gave 100 percent control of vegetation when applied at a dosage of 50 pounds per acre to soil planted with radish, *Raphanus sativus*, seeds.

Example 2.—Ethyl N-phthalidylcarbamate

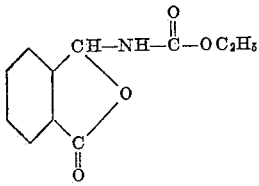

44.5 grams (0.5 mole) of ethyl carbamate, 75.0 grams (0.5 mole) of phthalaldehydic acid and 200 milliliters of methyl ethyl ketone were mixed together and heated under reflux for 4 hours. At the end of this period, the solvent was distilled off to obtain an oily residue. The residue was poured into about 2 liters of water, whereupon it precipitated as a solid. The latter was separated by filtration, washed with water and dried at 60° C. to obtain an ethyl N-phthalidylcarbamate product melting at 171°–172° C. The yield of the product amounted to 81 grams or 74 percent of theoretical.

The above product is useful as a toxicant in germicidal and antiseptic compositions. In a representative operation, a solid nutrient agar medium saturated with ethyl N-phthalidylcarbamate gave complete inhibition of growth when streaked with *Staphlococcus aureus* and incubated at 30° C. for three days.

Example 3.—Ethyl N-methyl-N-phthalidylcarbamate

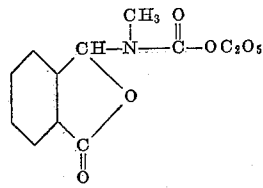

25.8 grams (0.25 mole) of ethyl N-methylcarbamate, 37.5 grams (0.25 mole) of phthalaldehydic acid and 100 milliliters of methyl ethyl ketone were mixed together and heated on the steam bath at the boiling point for 2 hours to produce the desired product and water of reaction. Thereafter the solvent was evaporated under a jet of air. The residual liquid was heated another 4 hours and then poured into 300 milliliters of water whereupon an oil precipitated. The latter was extracted with benzene. The benzene extract was washed with water and then heated to distill the solvent and obtain a crude ethyl N-methyl-N-phthalidylcarbamate product as an oily residue. The oily residue was allowed to stand about two months to precipitate the unreacted phthalaldehydic acid. The liquid product was decanted from the unreacted acid to recover a purified ethyl N-methyl-N-phthalidylcarbamate product having a refractive index, $n_D^{60°}$, of 1.526.

Example 4.—2-(2-carbamolyoxyethoxy)ethyl N-phthalidylcarbamate

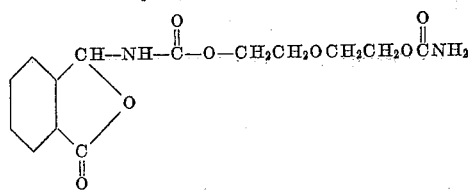

28.8 grams (0.15 mole) of the diethyleneglycol diester of carbamic acid, 45.0 grams (0.30 mole) of phthalaldehydic acid and 150 milliliters of water were mixed together and heated on the steam bath for 1.5 hours. At the end of this period, the mixture was cooled whereupon a solid precipitated. The latter was recovered by filtration and washed repeatedly and successively with water and acetone to obtain a 2-(2-carbamolyoxyethoxy)-ethyl N-phthalidylcarbamate product melting at 212°–216° C.

Example 5.—3-methoxypropyl N-phthalidyl-N-methylcarbamate 73.5 grams (0.5 mole) of 3-methoxypropyl N-methylcarbamate, 75.0 grams (0.5 mole) of phthalaldehydic acid and 200 milliliters of methyl ethyl ketone are mixed together and heated under reflux for 4 hours. At the end of this period, the solvent is distilled off to obtain an oily residue. The residue is poured into about 2 liters of water to precipitate a solid product. The latter is recovered from the mixture by filtration, washed with water and dried to obtain a 3-methoxypropyl N-phthalidyl-N-methylcarbamate product having a molecular weight of 279.

In similar preparations the following compounds are prepared:

Phenyl N-ethyl-N-phthalidylcarbamate having a molecular weight of 297 by the reaction of phenyl N-ethyl-carbamate with phthalaldehydic acid.

p-Tolyl N-phthalidylcarbamate having a molecular weight of 282 by the reaction of p-tolyl carbamate with phthalaldehydic acid.

Isopropyl N-phthalidylcarbamate having a molecular weight of 235 by the reaction of isopropyl carbamate with phthalaldehydic acid.

Normal-amyl N-methyl-phthalidylcarbamate having a molecular weight of 277 by the reaction of normal-amyl N-methylcarbamate with phthalaldehydic acid.

2-(2-carbamoyloxy-2-2methylethoxy)-1-methylethyl N-phthalidylcarbamate having a molecular weight of 352 by the reaction of dicarbamate of 1,1'-oxydi-2-propanol (dipropyleneglycol diester of carbamic acid) with phthalaldehydic acid.

2-(2-normal-butoxyethoxy)ethyl N-phthalidylcarbamate having a molecular weight of 337 by the reaction of 2-(2-normal-butoxyethoxy)ethyl carbamate with phthalaldehydic acid.

Other N-phthalidyl carbamates embraced in the present invention include allyl N-phthalidyl carbamate, 3-chloropropyl N-phthalidylcarbamate, 2-carbisopropoxyethyl N-phthalidylcarbamate 2-(2-ethoxyethyl)ethyl N-phthalidyl carbamate, benzyl N-methyl-N-phthalidylcarbamate, 2-phenylethyl N-phthalidylcarbamate, normal-butylphenyl N-phthalidylcarbamate, 2-methoxyphenyl N-phthalidylcarbamate and 4-ethoxyphenyl N-methyl-N-phthalidylcarbamate.

The phthalaldehydic acid employed in this invention may be prepared by first photochlorinating o-xylene to obtain α,α,α′,α′-pentachloro-o-xylene by passing chlorine gas into o-xylene while illuminating with sun lamps. The resulting chlorinated o-xylene may be heated with an aqueous constant boiling hydrochloric acid and ferric chloride solution to obtain phthalaldehydic acid as more fully disclosed in U. S. Patent 2,748,162.

The carbamic acid esters to be employed as starting materials as previously described may be prepared by several known methods. In a convenient method the appropriate chloroformic ester is added to ammonia or an appropriate primary amine while cooling to produce the desired carbamate. The latter may be recovered and purified by conventional procedures such as extraction and distillation.

This application is a continuation-in-part of our copending application Serial No. 602,058 filed August 3, 1956, now abandoned.

We claim:

1. An N-phthalidyl carbamic acid ester having the structure

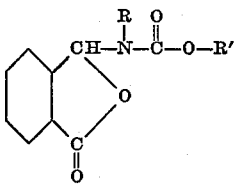

wherein R represents a member of the group consisting of hydrogen and lower-alkyl radicals containing from 1 to 2 carbon atoms, icnlusive, and R′ represents a member of the group consisting of lower-alkenyl containing from 3 to 4 carbon atoms, lower-alkyl containing from 1 to 5 carbon atoms, inclusive, lower-alkoxy-lower-alkyl, chloro-lower-alkyl, carb-lower-alkoxy - lower - alkyl, carbamoyloxy-lower-alkoxy-lower-alkyl, lower-alkoxy-lower-alkoxy-lower-alkyl, phenyl-lower-alkyl, phenyl, lower-alkylphenyl, lower-alkoxyphenyl and chloro-phenyl.

2. o-Chlorophenyl N-phthalidylcarbamate.
3. Ethyl N-phthalidylcarbamate.
4. Ethyl N-methyl-N-phthalidylcarbamate.
5. 2-(2-carbamoyloxyethoxy)ethyl N-phthalidyl carbamate.
6. A method for preparing N-phthalidyl carbamic acid esters having the structure

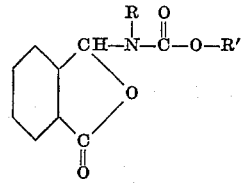

wherein R represents a member of the group consisting of hydrogen and lower-alkyl radicals containing from 1 to 2 carbon atoms, inclusive, and R′ represents a member of the group consisting of lower-alkenyl containing from 3 to 4 carbon atoms, lower-alkyl containing from 1 to 5 carbon atoms, inclusive, lower-alkoxy-lower-alkyl, chloro-lower-alkyl, carb-lower-alkoxy-lower-alkyl carbamoyloxy-lower-alkoxy-lower-alkyl, lower-alkoxy-lower-alkoxy-lower-alkyl, phenyl-lower-alkyl, phenyl, lower-alkylphenyl, lower-alkoxyphenyl, and chlorophenyl, which comprises the step of mixing phthalaldehydic acid with a carbamic acid ester and maintaining the mixture in the temperature range of from 20° to 150° C. for a time sufficient to allow completion of the reaction.

No references cited.